United States Patent
Sakurai

(10) Patent No.: US 12,455,235 B2
(45) Date of Patent: Oct. 28, 2025

(54) OPTICAL COMB MEASURING APPARATUS

(71) Applicant: ADVANTEST Corporation, Tokyo (JP)

(72) Inventor: Takao Sakurai, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 245 days.

(21) Appl. No.: 18/387,966

(22) Filed: Nov. 8, 2023

(65) Prior Publication Data

US 2024/0255423 A1 Aug. 1, 2024

(30) Foreign Application Priority Data

Feb. 1, 2023 (JP) .................. 2023-013766

(51) Int. Cl.
| | |
|---|---|
| G01N 21/45 | (2006.01) |
| G01B 9/02001 | (2022.01) |
| G01N 33/00 | (2006.01) |

(52) U.S. Cl.
CPC ......... *G01N 21/45* (2013.01); *G01B 9/02007* (2013.01); *G01B 9/02008* (2013.01); *G01B 9/02012* (2013.01); *G01N 33/0027* (2013.01)

(58) Field of Classification Search
CPC ............... G01N 21/45; G01N 33/0027; G01B 9/02007; G01B 9/02008; G01B 9/02012; G01J 3/45
See application file for complete search history.

(56) References Cited

U.S. PATENT DOCUMENTS

| | | | |
|---|---|---|---|
| 2011/0069309 A1* | 3/2011 | Newbury | G01J 3/453 356/326 |
| 2012/0002212 A1* | 1/2012 | Chandler | G01J 3/457 356/454 |
| 2019/0280450 A1 | 9/2019 | Heckl et al. | |

(Continued)

FOREIGN PATENT DOCUMENTS

| | | |
|---|---|---|
| JP | 2015-132774 | 7/2015 |
| JP | 2019-179918 | 10/2019 |
| WO | 2015/045266 A1 | 4/2015 |

*Primary Examiner* — Jonathan M Hansen
(74) *Attorney, Agent, or Firm* — GREENBLUM & BERNSTEIN, P.L.C.

(57) ABSTRACT

An optical comb measuring apparatus that measures an irradiation target having multiple types of measuring targets, includes: an interference signal acquiring section; and a frequency spectrum measuring section. The interference signal acquiring section acquires an interference signal between a post-irradiation signal comb obtained by irradiating the irradiation target with a pre-irradiation signal comb and a local comb set to be different from a repetition frequency of the pre-irradiation signal comb by a predetermined differential frequency. The frequency spectrum measuring section measures a frequency spectrum of a result of acquisition by the interference signal acquiring section. Either one or both of the post-irradiation signal comb and the local comb provided to the interference signal acquiring section have only components within a plurality of required bands including all of predetermined frequencies. Frequency bands of the interference signal corresponding to the plurality of respective required bands have no areas overlapping each other.

14 Claims, 13 Drawing Sheets

(56) References Cited

U.S. PATENT DOCUMENTS

| | | | | |
|---|---|---|---|---|
| 2019/0391016 | A1* | 12/2019 | Bourbeau Hébert | ........................ G01B 9/02008 |
| 2021/0063243 | A1* | 3/2021 | Anandarajah | .......... G01N 21/45 |
| 2021/0063306 | A1* | 3/2021 | Gianella | ................ G01N 21/39 |
| 2022/0102930 | A1* | 3/2022 | Nakamura | ............ H01S 3/0092 |
| 2022/0163389 | A1* | 5/2022 | Marandi | ............... G01J 3/0275 |
| 2023/0349761 | A1* | 11/2023 | Coddington | .............. G01J 3/10 |

* cited by examiner

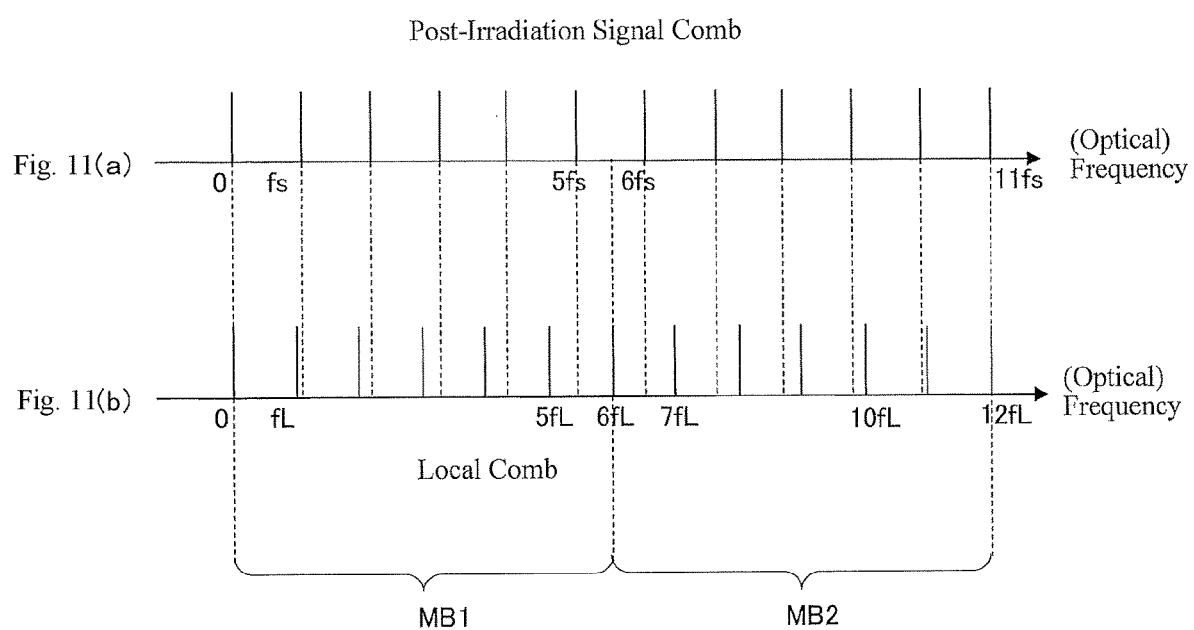

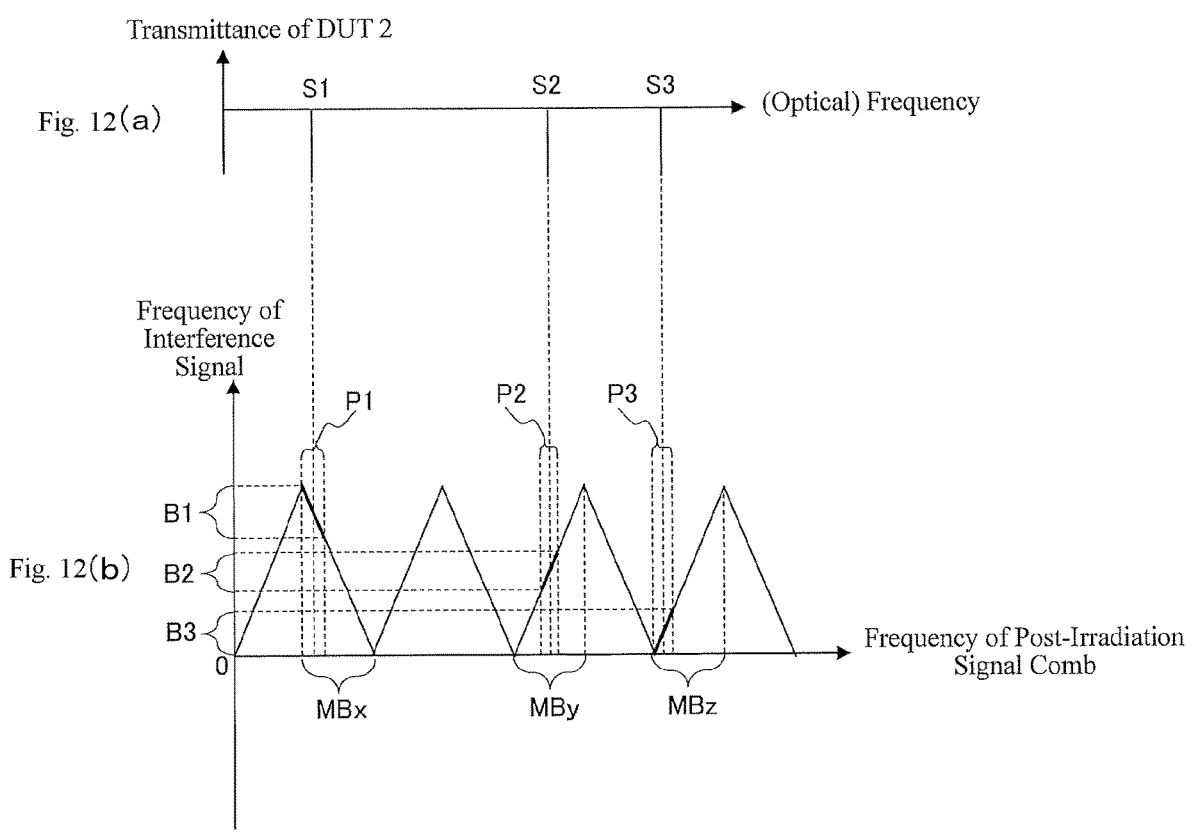

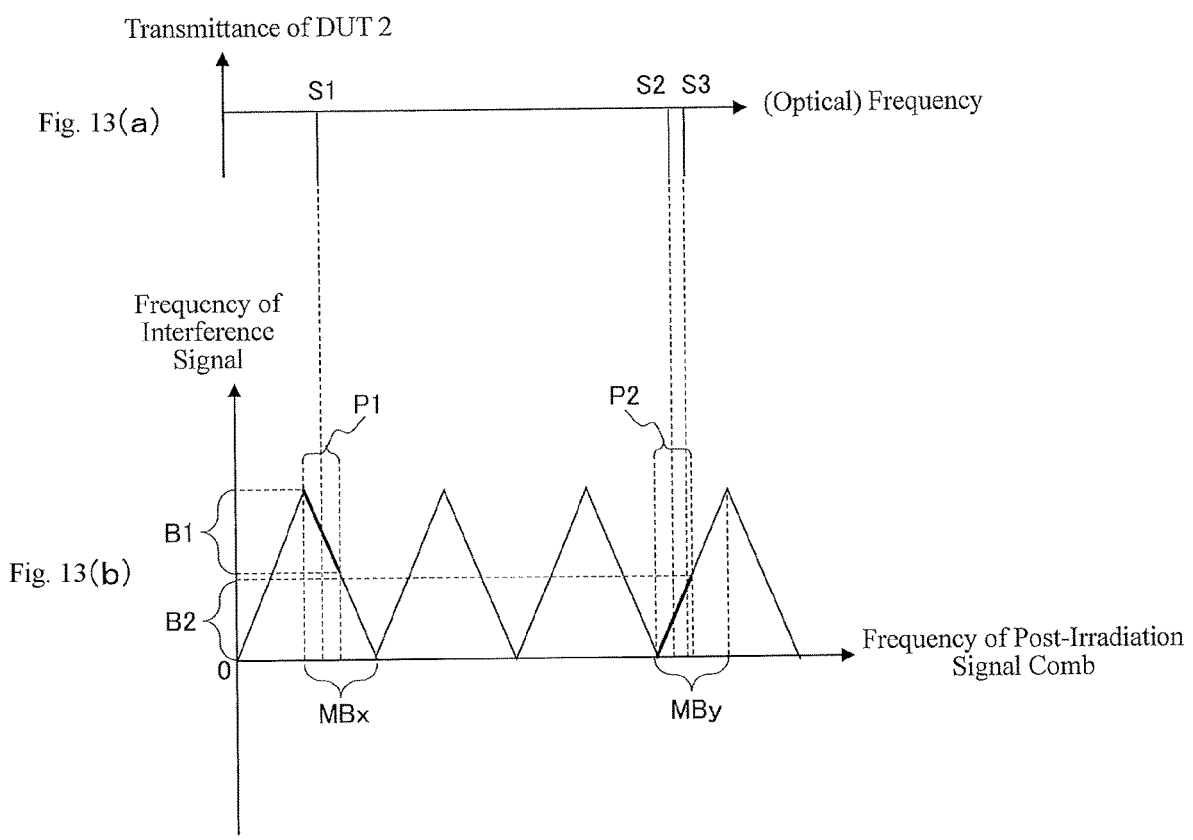

OPTICAL COMB MEASURING APPARATUS

BACKGROUND OF THE INVENTION

Field of the Invention

The present invention relates to dual-comb spectroscopy.

Description of the Related Art

There have conventionally been known dual-comb spectroscopy-based measurements (see Japanese Patent Application Publication No. 2015-132774, WO 2015/045266 A1, and Japanese Patent Application Publication No. 2019-179918, for example). In accordance with dual-comb spectroscopy, an interference signal (interferogram) is obtained and acquired by multiplexing a signal comb (post-irradiation) obtained by irradiating an irradiation target with a signal comb (pre-irradiation), which is an optical comb, and a version (local comb) of the signal comb (pre-irradiation) with a different repetition frequency. Further, in accordance with dual-comb spectroscopy, the interferogram undergoes a Fourier transform, whereby the optical spectrum of the irradiation target is measured.

It is here assumed that the irradiation target has multiple types (e.g. two types) of measuring targets. In this case, the optical spectra of these two types of measuring targets should be present within the measurable band of dual-comb spectroscopy. If the optical spectra of these two types of measuring targets have their respective significantly different optical frequencies, it is necessary to increase the measurable band. In order to increase the measurable band, it is necessary to reduce the difference between the repetition frequency of the signal comb (pre-irradiation) and the repetition frequency of the local comb.

SUMMARY OF THE INVENTION

However, reducing the difference between the repetition frequency of the signal comb (pre-irradiation) and the repetition frequency of the local comb may result in an increase in time required for measurement.

It is hence an object of the present invention to shorten the time required for measurement of multiple types of measuring targets by dual-comb spectroscopy.

According to the present invention, an optical comb measuring apparatus that measures an irradiation target having multiple types of measuring targets, includes: an interference signal acquiring section arranged to acquire an interference signal between a post-irradiation signal comb obtained by irradiating the irradiation target with a pre-irradiation signal comb and a local comb set to be different from a repetition frequency of the pre-irradiation signal comb by a predetermined differential frequency: and a frequency spectrum measuring section arranged to measure a frequency spectrum of a result of acquisition by the interference signal acquiring section, wherein the pre-irradiation signal comb, the post-irradiation signal comb, and the local comb are optical combs, a power of light with which the irradiation target is irradiated varies at predetermined frequencies corresponding to the respective measuring targets, a plurality of measurable band, each of which is a frequency range of the post-irradiation signal comb in which a single frequency of the post-irradiation signal comb corresponds to a frequency of the interference signal, each include one or more of the predetermined frequencies, either one or both of the post-irradiation signal comb and the local comb provided to the interference signal acquiring section have only components within a plurality of required bands including all of the predetermined frequencies, and frequency bands of the interference signal corresponding to the plurality of respective required bands have no areas overlapping each other.

According to the thus constructed optical comb measuring apparatus, an irradiation target having multiple types of measuring targets are measured. An interference signal acquiring section acquires an interference signal between a post-irradiation signal comb obtained by irradiating the irradiation target with a pre-irradiation signal comb and a local comb set to be different from a repetition frequency of the pre-irradiation signal comb by a predetermined differential frequency. A frequency spectrum measuring section measures a frequency spectrum of a result of acquisition by the interference signal acquiring section. The pre-irradiation signal comb, the post-irradiation signal comb, and the local comb are optical combs. A power of light with which the irradiation target is irradiated varies at predetermined frequencies corresponding to the respective measuring targets. A plurality of measurable band, each of which is a frequency range of the post-irradiation signal comb in which a single frequency of the post-irradiation signal comb corresponds to a frequency of the interference signal, each include one or more of the predetermined frequencies. Either one or both of the post-irradiation signal comb and the local comb provided to the interference signal acquiring section have only components within a plurality of required bands including all of the predetermined frequencies. Frequency bands of the interference signal corresponding to the plurality of respective required bands have no areas overlapping each other.

According to the present invention, the optical comb measuring apparatus may further include a multiple-band passage section arranged to receive either one or both of the pre-irradiation signal comb and the local comb and cause components of the plurality of required bands to pass therethrough.

According to the present invention, the optical comb measuring apparatus may further include a multiple-band passage section arranged to receive either one or both of the post-irradiation signal comb and the local comb and cause components of the plurality of required bands to pass therethrough.

According to the optical comb measuring apparatus of the present invention, either one or both of the pre-irradiation signal comb and the local comb may have only components within a plurality of required bands including all of the predetermined frequencies.

According to the optical comb measuring apparatus of the present invention, each one of the measurable bands may include each one of the predetermined frequencies.

According to the optical comb measuring apparatus of the present invention, any one or more of the measurable bands may include a plurality of the predetermined frequencies.

According to the optical comb measuring apparatus of the present invention, the irradiation target may be gas.

According to the optical comb measuring apparatus of the present invention, the irradiation target may be housed in a gas cell.

According to the optical comb measuring apparatus of the present invention, the apparatus may measure a concentration of each measuring target.

According to the optical comb measuring apparatus of the present invention, the irradiation target may be liquid or solid.

According to the optical comb measuring apparatus of the present invention, the apparatus may measure a presence of each measuring target.

According to the optical comb measuring apparatus of the present invention, the post-irradiation signal comb and the local comb may be provided via a polarization maintaining fiber to the interference signal acquiring section.

According to the optical comb measuring apparatus of the present invention, the interference signal acquiring section may be an optical coupler.

According to the optical comb measuring apparatus of the present invention, the interference signal acquiring section may be a power beam splitter.

BRIEF DESCRIPTION OF THE DRAWINGS

FIGS. 11 (a) and 11 (b) show the frequency spectrum of the post-irradiation signal comb (FIG. 11(a)) and the local comb (FIG. 11(b)) when 11fs=12fL:

FIGS. 12 (a) and 12 (b) show the absorption spectrum of the measuring targets within the irradiation target (FIG. 12(a)) and the correspondence between the frequency of the post-irradiation signal comb and the frequency of the interference signal (embodiment) (FIG. 12(b)), according to a sixth variation of the embodiment of the present invention; and FIGS. 13 (a) and 13 (b) show the absorption spectrum of the measuring targets within the irradiation target (FIG. 13(a)) and the correspondence between the frequency of the post-irradiation signal comb and the frequency of the interference signal (embodiment) (FIG. 13(b)), according to a seventh variation of the embodiment of the present invention.

DESCRIPTION OF THE PREFERRED EMBODIMENT

A preferred embodiment of the present invention will hereinafter be described with reference to the accompanying drawings.

Figure 1:
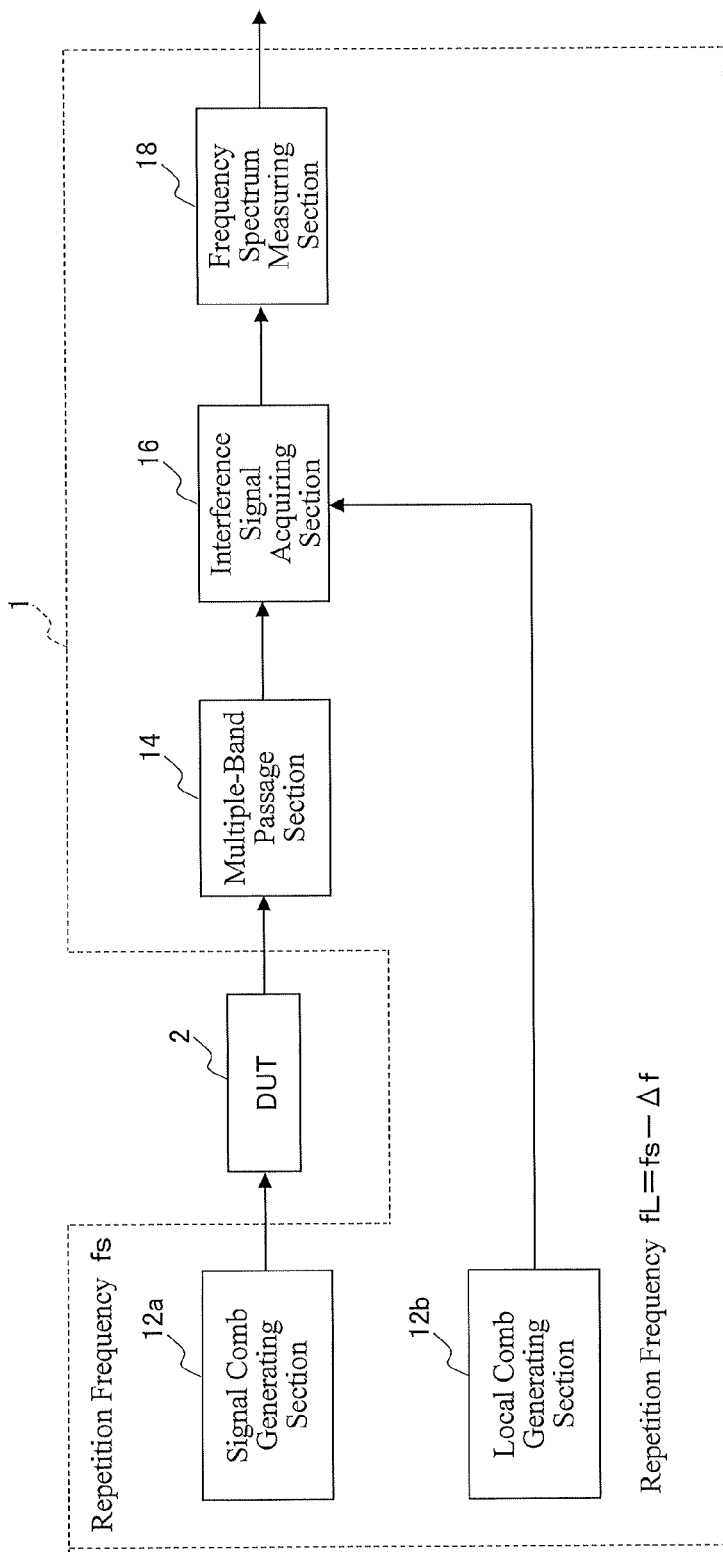
FIG. 1 shows the configuration of an optical comb measuring apparatus 1 according to an embodiment of the present invention.

FIG. 1 shows the configuration of an optical comb measuring apparatus 1 according to an embodiment of the present invention. The optical comb measuring apparatus 1 according to the embodiment of the present invention is arranged to measure an irradiation target having multiple types of measuring targets.

For example, the irradiation target is gas housed in a gas cell (DUT 2 in the embodiment of the present invention). In more detail, gas flows into and out of the gas cell. It is noted that the gas has multiple types (e.g. two types) of measuring targets. The optical comb measuring apparatus 1 may also be arranged to measure the concentration of each measuring target. The method of measuring the concentration of each measuring target is well known and will not be described.

The optical comb measuring apparatus 1 according to the embodiment of the present invention includes a signal comb generating section 12a, a local comb generating section 12b, a multiple-band passage section 14, an interference signal acquiring section 16, and a frequency spectrum measuring section 18.

The signal comb generating section 12a is arranged to generate a pre-irradiation signal comb (a signal comb before irradiation of the irradiation target). The local comb generating section 12b is arranged to generate a local comb. The pre-irradiation signal comb and the local comb are optical combs.

FIGS. 2(a) and 2(b) show the frequency spectrum of the pre-irradiation signal comb (FIG. 2(a)) and the local comb (FIG. 2(b)). The vertical axis represents the optical power. Referring to FIG. 2(a), the frequency spectrum of the pre-irradiation signal comb includes frequencies 0, fs, 2fs, ... (with a repetition frequency of fs). Referring to FIG. 2(b), the frequency spectrum of the local comb includes frequencies 0, fL, 2fL, ... (with a repetition frequency of fL). Note here that the local comb is set to be different from the repetition frequency fs of the pre-irradiation signal comb by a predetermined differential frequency $\Delta f$ (=fs−fL). It is noted that the frequencies of the pre-irradiation signal comb and the local comb are roughly the frequency of light.

Figure 2:
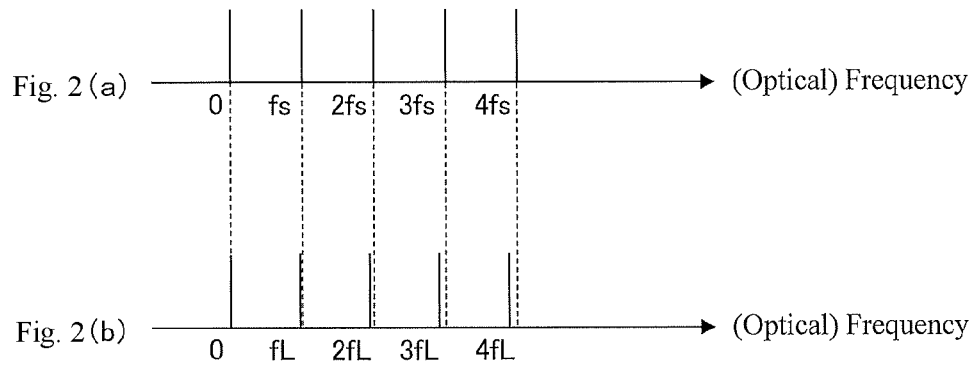
FIGS. 2(a) and 2(b) show the frequency spectrum of the pre-irradiation signal comb (FIG. 2(a)) and the local comb (FIG. 2(b))

Note here that the frequency spectrum of the pre-irradiation signal comb and the local comb actually has a minimum frequency of mfs (=nfL, where m and n are positive integers), though shown as 0 in FIG. 2 (for illustration and explanation purposes). Accordingly, the frequency spectrum of the pre-irradiation signal comb actually includes frequencies mfs, mfs+fs, mfs+2fs, ... and the frequency spectrum of the local comb includes frequencies nfL, nfL+fL, nfL+2fL, .... It is noted that m is, for example, about four million.

The pre-irradiation signal comb, when the irradiation target (gas) within the DUT (gas cell) 2 is irradiated therewith, penetrates through the DUT 2 to be a post-irradiation signal comb. Like the pre-irradiation signal comb, the post-irradiation signal comb is also an optical comb. It is noted that the post-irradiation signal comb is provided to the multiple-band passage section 14 and components that have passed therethrough are provided to the interference signal acquiring section 16.

Figure 3:
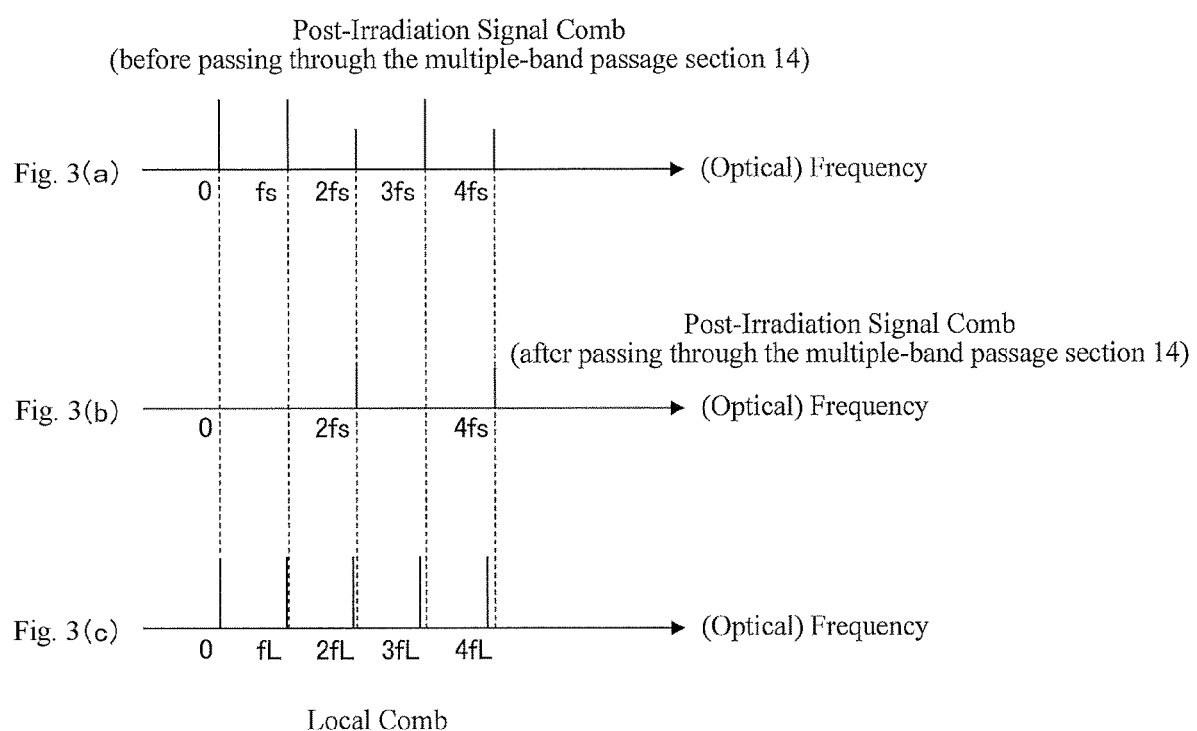
FIGS. 3(a), 3(b), and 3(c) show the frequency spectrum of the post-irradiation signal comb (before passing through the multiple-band passage section 14) (FIG. 3(a)), the post-irradiation signal comb (after passing through the multiple-band passage section 14) (FIG. 3(b)), and the local comb (FIG. 3(c))

FIGS. 3(*a*), 3(*b*), and 3(*c*) show the frequency spectrum of the post-irradiation signal comb (before passing through the multiple-band passage section 14) (FIG. 3(*a*)), the post-irradiation signal comb (after passing through the multiple-band passage section 14) (FIG. 3(*b*)), and the local comb (FIG. 3(*c*)). The vertical axis represents the optical power. Note here that FIG. 3(*c*) is the same as FIG. 2(*b*).

It is noted that as is the case in FIG. 2, the frequency spectrum of the post-irradiation signal comb and the local comb actually has a minimum frequency of mfs (=nfL), though shown as 0 also in FIG. 3 (for illustration and explanation purposes).

It is assumed in FIG. 3 that the power of light with which the irradiation target within the DUT 2 is irradiated varies to be lower (implying light absorption) at predetermined frequencies (2fs and 4fs) corresponding to the respective measuring targets. It is assumed in FIG. 3, for illustration and explanation purposes, that the difference between the frequencies (2fs and 4fs) at which the power of light with which the irradiation target is irradiated is low is merely 2fs at most, but it is rather common that such a difference between frequencies is much larger (see FIG. 6, for example).

Referring to FIG. 3(*a*), the post-irradiation signal comb before passing through the multiple-band passage section 14 has reduced optical power at predetermined frequencies (2fs and 4fs) of the pre-irradiation signal comb corresponding to the respective measuring targets.

It is here assumed that the multiple-band passage section 14 is arranged to cause signals in the bands around the frequencies 2fs and 4fs to pass therethrough, while not to cause signals in the other bands to pass therethrough. Referring to FIG. 3(*b*), the post-irradiation signal comb after passing through the multiple-band passage section 14 then has only components of the frequencies 2fs and 4fs.

The interference signal acquiring section 16 is arranged to acquire an interference signal between the post-irradiation signal comb and the local comb. Since the predetermined differential frequency Δf has a relatively low value, the post-irradiation signal comb and the local comb generate beats. The interference signal acquiring section 16 is, for example, an optical coupler, the interference signal acquiring section 16 arranged to be provided with the post-irradiation signal comb and the local comb through the polarization maintaining fiber and an optical attenuator. The frequency spectrum measuring section 18 is arranged to measure the frequency spectrum of a result of acquisition by the interference signal acquiring section 16.

Figure 4:
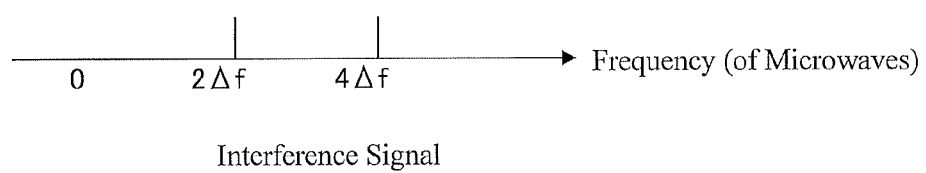
FIG. 4 shows the frequency spectrum of a result of measurement of an interference signal by the frequency spectrum measuring section 18.

FIG. 4 shows the frequency spectrum of a result of measurement of an interference signal by the frequency spectrum measuring section 18. Referring to FIGS. 3(*b*) and 3(*c*), the component of the frequency 2fs of the post-irradiation signal comb and the component of the frequency 2fL of the local comb generate beats, and the component of the differential frequency 2Δf (=2fs−2fL) between them is measured (see FIG. 4). In addition, the component of the frequency 4fs of the post-irradiation signal comb and the component of the frequency 4fL of the local comb generate beats, and the component of the differential frequency 4Δf (=4fs−4fL) between them is measured (see FIG. 4).

The components of the frequencies 2fs and 4fs of the post-irradiation signal comb are too high to be measured, but the components of the frequencies 2Δf and 4Δf of the interference signal are about the frequency of microwaves and thereby can be measured. This allows the presence and concentration of each measuring target to be measured.

It is noted that the components of the frequencies fs, 2fs, 3fs, . . . of the post-irradiation signal comb correspond to the components of the frequencies Δf, 2Δf, 3Δf, . . . of the interference signal. The components of the frequencies fs, 2fs, 3fs, . . . of the post-irradiation signal comb can therefore be measured by measuring the components of the frequencies Δf, 2Δf, 3Δf, . . . of the interference signal with the frequency spectrum measuring section 18. Note here that the band within which the post-irradiation signal comb can be measured is limited.

Figure 5:
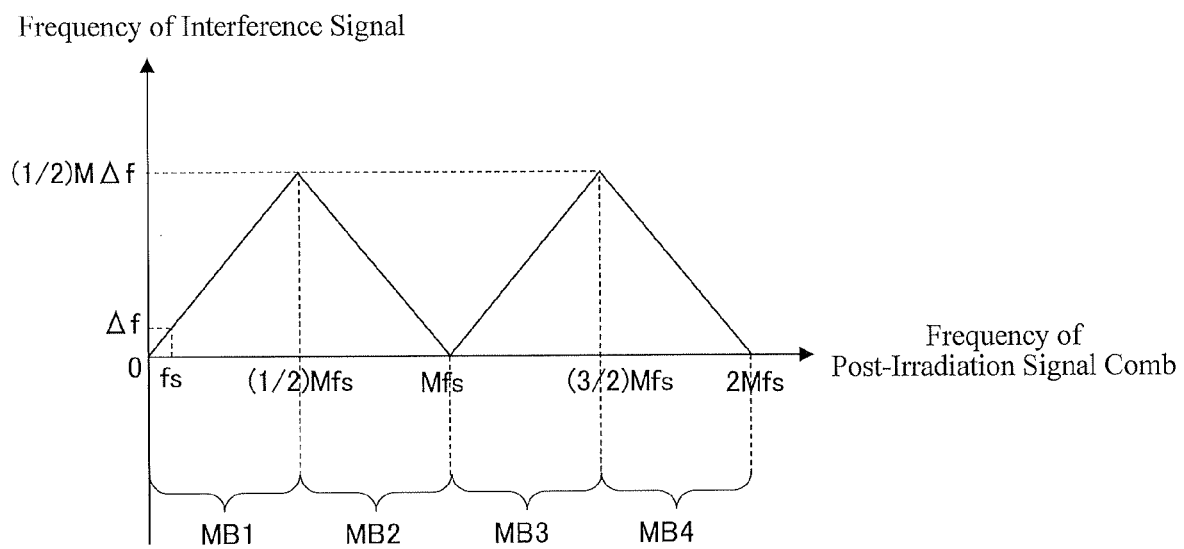
FIG. 5 shows the correspondence between the frequency of the post-irradiation signal comb and the frequency of the interference signal for the optical comb measuring apparatus 1 according to the embodiment of the present invention.

FIG. 5 shows the correspondence between the frequency of the post-irradiation signal comb and the frequency of the interference signal for the optical comb measuring apparatus 1 according to the embodiment of the present invention. Note here that FIG. 5 shows measurable bands MB1, MB2, MB3, MB4. Additionally, M in FIG. 5 is a positive integer and Mfs=(M+1) fL. It is noted that Mfs=(M+1) fL leads to MΔf=fL. Note here that the frequency of the post-irradiation signal comb actually has a minimum value of mfs (=nfL) (as is the case in FIG. 2), though shown as 0 in FIG. 5 (for illustration and explanation purposes).

FIGS. 11 (*a*) and 11 (*b*) show the frequency spectrum of the post-irradiation signal comb (FIG. 11(*a*)) and the local comb (FIG. 11(*b*)) when 11fs=12fL. That is, M=11. This results in 11Δf=fL. Note here that absorption of the signal comb is not shown in FIG. 11(*a*).

Referring to FIG. 11, the components of the frequencies fs, 2fs, . . . , 5fs of the post-irradiation signal comb and the components of the frequencies fL, 2fL, . . . , 5fL of the local comb generate beats. The frequencies of the beats are Δf, 2Δf, . . . , 5Δf.

However, the component of the frequency 6fs of the post-irradiation signal comb has a smaller differential frequency (5Δf) with respect to the component of the frequency 7fL of the local comb than the differential frequency (6Δf) with respect to the component of the frequency 6fL of the local comb. Accordingly, the component of the frequency 6fs of the post-irradiation signal comb and the component of the frequency 7fL of the local comb generate beats. The frequency of the beats is 5Δf. Similarly, the components of the frequencies 7fs, 8fs, . . . , 11fs of the post-irradiation signal comb and the components of the frequencies 8fL, 9fL, . . . , 12fL of the local comb generate beats. The frequencies of the beats are 4Δf, 3Δf, . . . , 0.

It is here assumed that the measurable band MB1 includes the frequencies 0 to (11/2)fs and the measurable band MB2 includes the frequencies (11/2)fs to 11fs. As for the post-irradiation signal comb within the measurable band MB1 or MB2, a single frequency of the post-irradiation signal comb corresponds to the frequency of the interference signal.

On the other hand, it should be noted that in the measurable bands MB1 and MB2, multiple frequencies of the post-irradiation signal comb correspond to the frequency of the interference signal. For example, the component of the frequency 5Δf of the interference signal corresponds to the components of the frequencies 5fs and 6fs of the post-irradiation signal comb. In this case, what can be acquired by measuring the component of the frequency 5Δf of the interference signal is only the optical power of the sum of the components of the frequencies 5fs and 6fs of the post-irradiation signal comb (aliasing occurs).

Accordingly, only one of the measurable bands MB1 and MB2 can serve as a measurable band.

Referring to FIG. 5, in the measurable band MB1 (the frequency of the post-irradiation signal comb is 0 to (½)

Mfs), as the frequency of the post-irradiation signal comb increases by fs, the frequency of the interference signal also increases by Δf. When the frequency of the post-irradiation signal comb is (½)Mfs, the frequency of the interference signal has a maximum value of (½)MΔf.

In the measurable band MB2 (the frequency of the post-irradiation signal comb is (½)Mfs to Mfs), as the frequency of the post-irradiation signal comb increases by fs, the frequency of the interference signal decreases by Δf. When the frequency of the post-irradiation signal comb is Mfs, the frequency of the interference signal has a minimum value of 0.

In the measurable band MB3 (the frequency of the post-irradiation signal comb is Mfs to (3/2)Mfs), as the frequency of the post-irradiation signal comb increases by fs, the frequency of the interference signal also increases by Δf. When the frequency of the post-irradiation signal comb is (3/2)Mfs, the frequency of the interference signal has a maximum value of (½)MΔf.

In the measurable band MB4 (the frequency of the post-irradiation signal comb is (3/2)Mfs to 2Mfs), as the frequency of the post-irradiation signal comb increases by fs, the frequency of the interference signal decreases by Δf. When the frequency of the post-irradiation signal comb is 2Mfs, the frequency of the interference signal has a minimum value of 0.

It is noted that the measurable band MB1, MB2, MB3, MB4 each have a bandwidth of (½)Mfs.

FIGS. 6(a), 6(b), and 6(c) show the absorption spectrum of the measuring targets within the irradiation target (FIG. 6(a)), the correspondence between the frequency of the post-irradiation signal comb and the frequency of the interference signal (comparative example) (FIG. 6(b)), and the correspondence between the frequency of the post-irradiation signal comb and the frequency of the interference signal (embodiment) (FIG. 6(c)).

Referring to FIG. 6(a), the power of light with which the irradiation target is irradiated varies at predetermined frequencies S1, S2 corresponding to the respective measuring targets. Specifically, light is absorbed at the predetermined frequencies S1, S2, resulting in low transmittance. It is noted that the frequencies S1 and S2 make a significant difference of about 23 THz.

Referring to FIG. 6(b), the post-irradiation signal comb of a frequency within the measurable band MB2 is used to obtain and measure an interference signal (comparative example). The measurable band MB2 then has an increased bandwidth because it is necessary to include frequencies S1 and S2 within the measurable band MB2. Where (bandwidth of the measurable band MB2)=(½)Mfs, it is necessary to increase M in order to increase the bandwidth of the measurable band MB2. In addition, since MΔf=fL, increasing M results in Δf decreasing. The time required for one time of measurement is the reciprocal of Δf. Since the measurement is repeated many times (e.g. 1000 times), the smaller Δf, the longer time the measurement takes.

Hence, in the embodiment of the present invention, multiple measurable bands MBx, MBy each include one or more of the predetermined frequencies S1, S2, as shown in FIG. 6(c). For example, each one of the measurable bands includes each one of the predetermined frequencies (the measurable band MBx includes the predetermined frequency S1, while the measurable band MBy includes the predetermined frequency S2), as shown in FIG. 6(c). Compared to the comparative example (see FIG. 6(b)) in which one measurable band (MB2) includes all of the predetermined frequencies (S1, S2), the measurable bands MBx, MBy can each have a reduced bandwidth in the embodiment of the present invention (see FIG. 6(c)) in which multiple measurable bands MBx, MBy each include one or more of the predetermined frequencies S1, S2. Note here that the frequency of the post-irradiation signal comb actually has a minimum value of mfs (=nfL) (as is the case in FIG. 2), though shown as 0 in FIG. 6(c) (for illustration and explanation purposes).

The measurable bands MBx, MBy (see FIG. 6(c)) each have a bandwidth narrower than that of the measurable band MB2 (see FIG. 6(b)). It is therefore not necessary to increase M. In addition, since MΔf=fL, not increasing M results in Δf not decreasing. The time required for one time of measurement is the reciprocal of Δf. While the measurement may be repeated many times (e.g. 1000 times), the time required for measurement can be shortened as long as Δf is not reduced.

However, when the post-irradiation signal comb of frequencies within the measurable bands MBx and MBy is used to obtain and measure an interference signal, aliasing may occur.

Hence, an interference signal (frequency band B1) corresponding to a component within a required band P1 within the measurable band MBx of the post-irradiation signal comb and an interference signal (frequency band B2) corresponding to a component within a required band P2 within the measurable band MBy of the post-irradiation signal comb are obtained and measured. For such a measurement, the post-irradiation signal comb is only required to have components within the multiple required bands P1 and P2. For example, the multiple-band passage section 14 may receive the post-irradiation signal comb and cause the components of the multiple required bands P1 and P2 to pass therethrough to the interference signal acquiring section 16.

Note here that the multiple required bands P1 and P2 include all of the predetermined frequencies S1 and S2. In addition, frequency bands B1 and B2 of the interference signal corresponding to the respective multiple required bands P1 and P2 have no areas overlapping each other.

Since the frequency bands B1 and B2 of the interference signal do not overlap each other, a component within the frequency band B1 of the interference signal, if obtained, proves to be a component within the measurable band MBx of the post-irradiation signal comb. Further, a component within the frequency band B2 of the interference signal, if obtained, proves to be a component within the measurable band MBy of the post-irradiation signal comb. It should be noted that the detected components within the measurable bands MBx and MBy of the post-irradiation signal comb are not mixed (aliasing does not occur).

Next will be described an operation according to the embodiment of the present invention.

The pre-irradiation signal comb (see FIG. 2(a)), when the irradiation target (gas) within the DUT (gas cell) 2 is irradiated therewith from the signal comb generating section 12a, penetrates through the DUT 2 to be a post-irradiation signal comb.

The post-irradiation signal comb is provided to the multiple-band passage section 14 and components that have passed therethrough are provided to the interference signal acquiring section 16. Note here that the passband of the multiple-band passage section 14 includes the required bands P1 and P2 (see FIG. 6(c)).

A local comb (see FIG. 2(b)) is also provided from the local comb generating section 12b to the interference signal acquiring section 16.

An interference signal between the post-irradiation signal comb (components passing through the multiple-band passage section 14) and the local comb is acquired by the interference signal acquiring section 16. The frequency spectrum of a result of acquisition by the interference signal acquiring section 16 is measured through the frequency spectrum measuring section 18.

In accordance with the embodiment of the present invention, it is possible to shorten the time required for measurement of multiple types of measuring targets by dual-comb spectroscopy.

Figure 6:
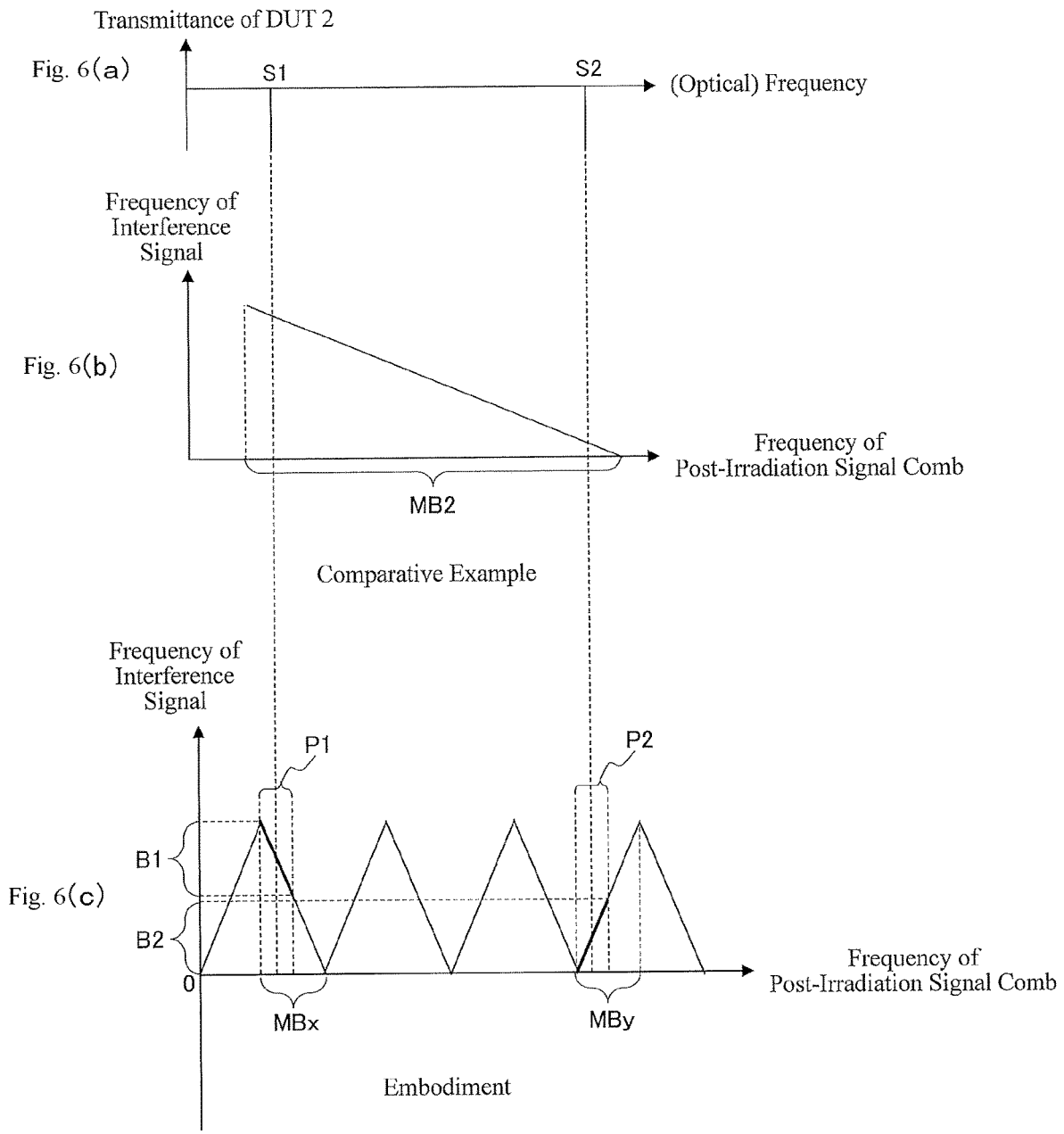
FIGS. 6 (a), 6(b)), and 6(c) show the absorption spectrum of the measuring targets within the irradiation target (FIG. 6(a)), the correspondence between the frequency of the post-irradiation signal comb and the frequency of the interference signal (comparative example) (FIG. 6(b)), and the correspondence between the frequency of the post-irradiation signal comb and the frequency of the interference signal (embodiment) (FIG. 6(c))

That is, Compared to the comparative example (see FIG. 6(*b*)) in which one measurable band (MB2) includes all of the predetermined frequencies (S1, S2), the measurable bands MBx, MBy can each have a reduced bandwidth in the embodiment of the present invention (see FIG. 6(*c*)) in which the measurable band MBx includes the predetermined frequency S1 and the measurable band MBy includes the predetermined frequency S2. It is therefore not necessary to increase M. In addition, since MΔf=fL, not increasing M results in Δf not decreasing. The time required for one time of measurement is the reciprocal of Δf. While the measurement may be repeated many times (e.g. 1000 times), the time required for measurement can be shortened as long as Δf is not reduced.

In addition, since the multiple-band passage section 14 receives the post-irradiation signal comb and causes the components of the multiple required bands P1 and P2 to pass therethrough to the interference signal acquiring section 16, the frequency bands B1 and B2 of the interference signal have no areas overlapping each other. Accordingly, aliasing cannot occur regardless of the measurement of the interference signal based on the multiple measurable bands MBx and MBy.

It is noted that the embodiment of the present invention can have various variations.

<First Variation>

Figure 7:
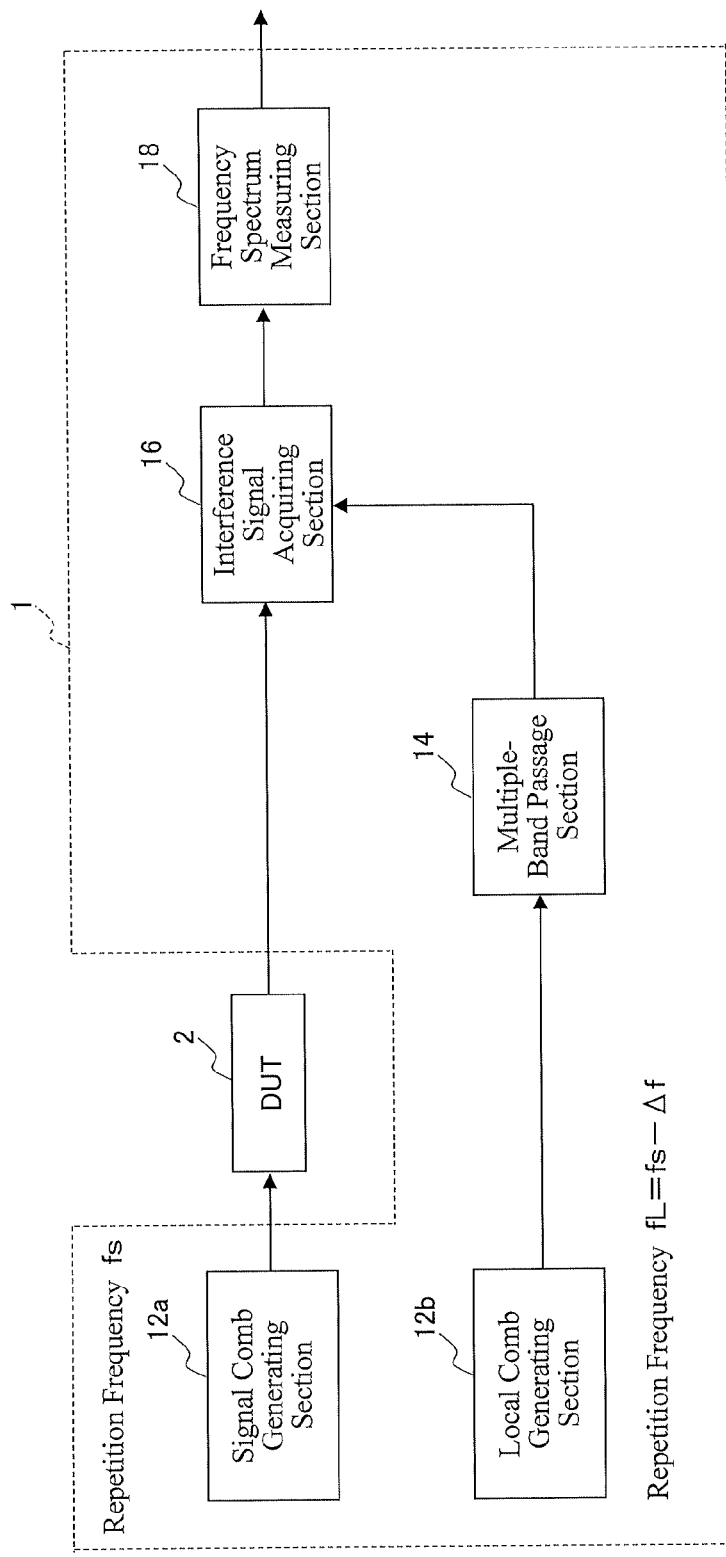
FIG. 7 shows the configuration of an optical comb measuring apparatus 1 according to a first variation of the embodiment of the present invention.

FIG. 7 shows the configuration of an optical comb measuring apparatus 1 according to a first variation of the embodiment of the present invention. In the optical comb measuring apparatus 1 according to the first variation, the multiple-band passage section 14 is disposed between the local comb generating section 12*b* and the interference signal acquiring section 16 instead of between the DUT 2 and the interference signal acquiring section 16.

The multiple-band passage section 14 is arranged to receive a local comb from the local comb generating section 12*b* and cause the components of multiple required bands P1 and P2 to pass therethrough to the interference signal acquiring section 16. In this case, the local comb has only components within the multiple required bands P1 and P2. The rest is the same as that of the embodiment of the present invention and will not be described.

<Second Variation>

Figure 8:
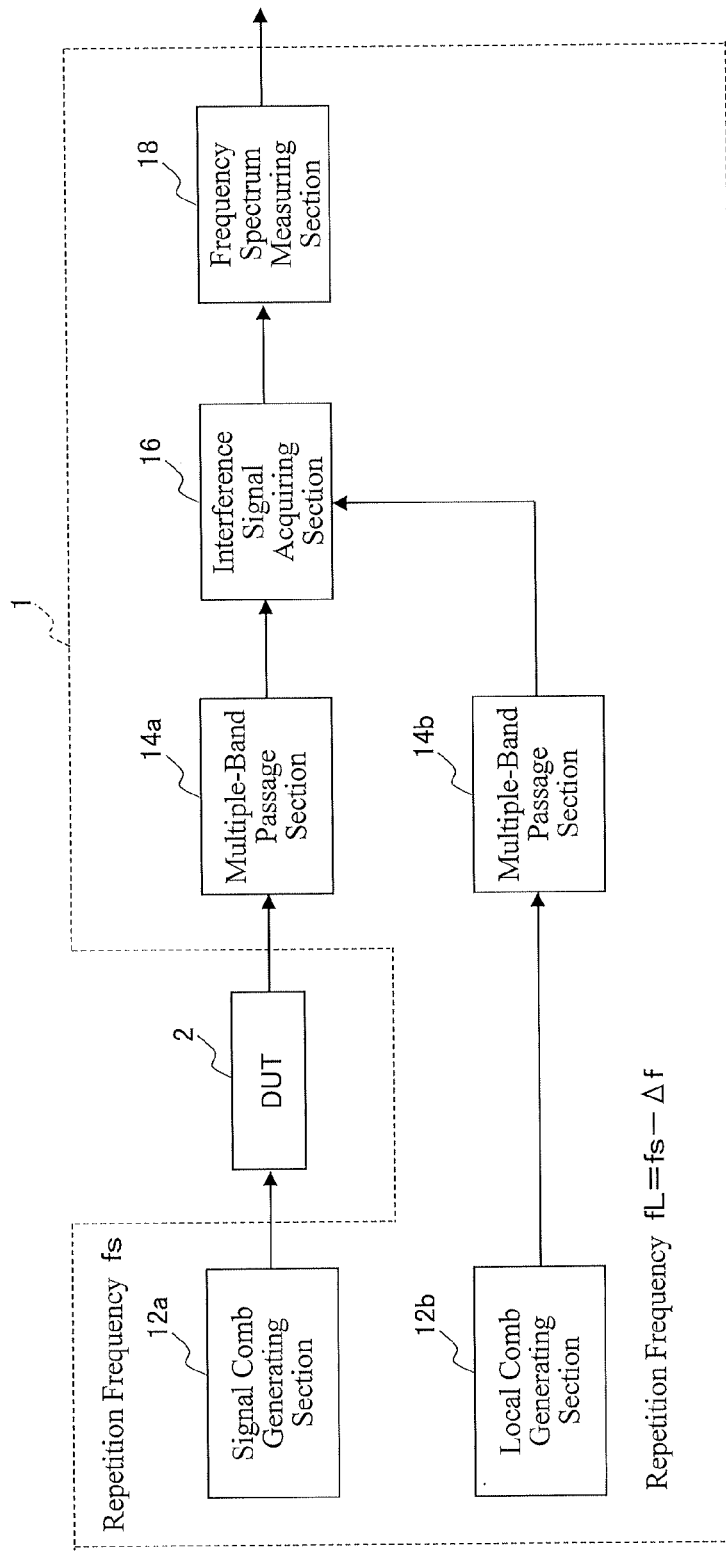
FIG. 8 shows the configuration of an optical comb measuring apparatus 1 according to a second variation of the embodiment of the present invention.

FIG. 8 shows the configuration of an optical comb measuring apparatus 1 according to a second variation of the embodiment of the present invention. In the optical comb measuring apparatus 1 according to the second variation, multiple-band passage sections are disposed both between the DUT 2 and the interference signal acquiring section 16 (multiple-band passage section 14*a*) and between the local comb generating section 12*b* and the interference signal acquiring section 16 (multiple-band passage section 14*b*).

The multiple-band passage section 14*a* is the same as the multiple-band passage section 14 according to the embodiment of the present invention (see FIG. 1). The multiple-band passage section 14*b* is the same as the multiple-band passage section 14 according to the first variation of the embodiment of the present invention (see FIG. 7). In this case, the post-irradiation signal comb and the local comb have only components within the multiple required bands P1 and P2. The rest is the same as that of the embodiment of the present invention and will not be described.

<Third Variation>

Figure 9:
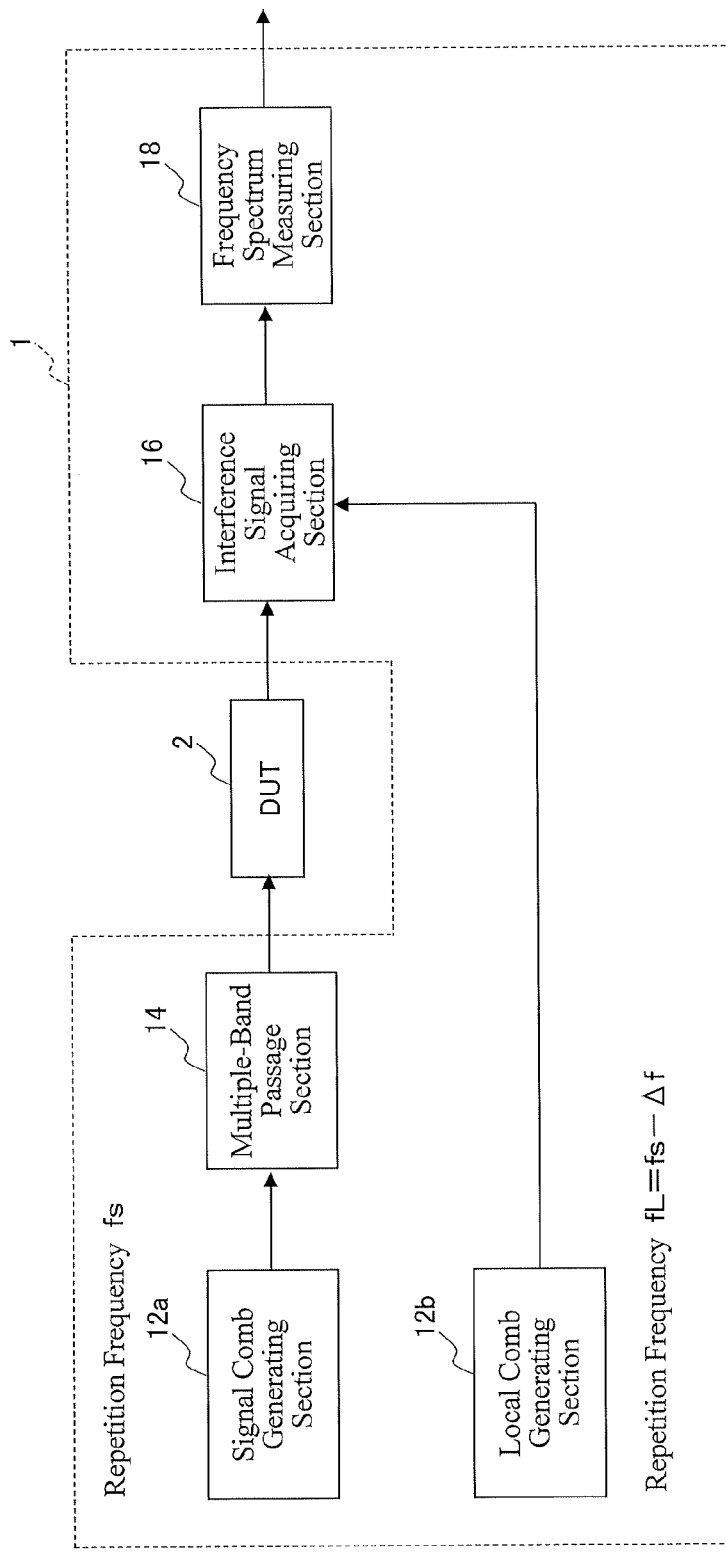
FIG. 9 shows the configuration of an optical comb measuring apparatus 1 according to a third variation of the embodiment of the present invention.

FIG. 9 shows the configuration of an optical comb measuring apparatus 1 according to a third variation of the embodiment of the present invention. In the optical comb measuring apparatus 1 according to the third variation, the multiple-band passage section 14 is disposed between the signal comb generating section 12*a* and the DUT 2 instead of between the DUT 2 and the interference signal acquiring section 16.

The multiple-band passage section 14 is arranged to receive a signal comb from the signal comb generating section 12*a* and cause the components of multiple required bands P1 and P2 to pass therethrough to the DUT 2. The rest is the same as that of the embodiment of the present invention and will not be described.

<Fourth Variation>

Figure 10:
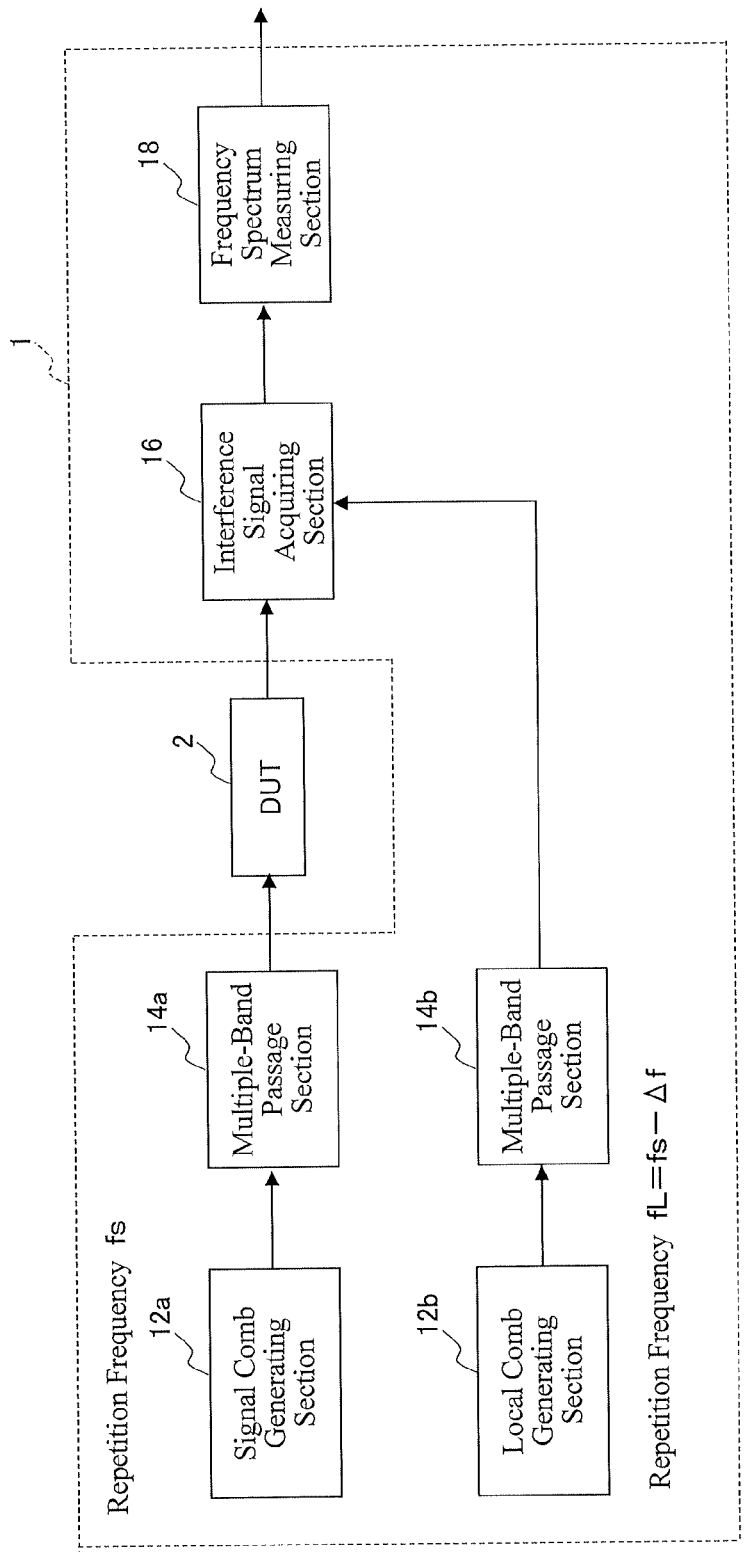
FIG. 10 shows the configuration of an optical comb measuring apparatus 1 according to a fourth variation of the embodiment of the present invention.

FIG. 10 shows the configuration of an optical comb measuring apparatus 1 according to a fourth variation of the embodiment of the present invention. In the optical comb measuring apparatus 1 according to the fourth variation, multiple-band passage sections are disposed both between the signal comb generating section 12*a* and the DUT 2 (multiple-band passage section 14*a*) and between the local comb generating section 12*b* and the interference signal acquiring section 16 (multiple-band passage section 14*b*).

The multiple-band passage section 14*a* is the same as the multiple-band passage section 14 according to the third variation of the embodiment of the present invention (see FIG. 9). The multiple-band passage section 14*b* is the same as the multiple-band passage section 14 according to the first variation of the embodiment of the present invention (see FIG. 7). The rest is the same as that of the embodiment of the present invention and will not be described.

<Fifth Variation>

In a fifth variation of the embodiment of the present invention, the multiple-band passage section 14 is removed from the optical comb measuring apparatus 1 according to the embodiment of the present invention. Note here that either one or both of the pre-irradiation signal comb and the local comb have only components within the multiple required bands P1 and P2 including all of the predetermined frequencies S1, S2.

<Sixth Variation>

FIGS. 12 (*a*) and 12 (*b*) show the absorption spectrum of the measuring targets within the irradiation target (FIG. 12(*a*)) and the correspondence between the frequency of the post-irradiation signal comb and the frequency of the interference signal (embodiment) (FIG. 12(*b*)), according to a sixth variation of the embodiment of the present invention. Note here that the frequency of the post-irradiation signal comb actually has a minimum value of mfs (=nfL) (as is the case in FIG. 2), though shown as 0 in FIG. 12(*b*) (for illustration and explanation purposes).

Referring to FIG. 12(*a*), the sixth variation includes three types of predetermined frequencies S1, S2, S3 corresponding to the measuring targets, unlike the embodiment of the present invention (including two types of predetermined frequencies S1, S2 corresponding to the measuring targets). Note here that referring to FIG. 12(*b*), each one of the measurable bands includes each one of the predetermined frequencies. That is, the measurable band MBx and the required band P1 include the predetermined frequency S1, the measurable band MBy and the required band P2 include the predetermined frequency S2, and the measurable band MBz and the required band P3 include the predetermined frequency S3. In addition, frequency bands B1, B2, and B3 of the interference signal corresponding to the respective multiple required bands P1, P2, and P3 have no areas overlapping each other.

<Seventh Variation>

FIGS. 13 (a) and 13 (b) show the absorption spectrum of the measuring targets within the irradiation target (FIG. 13(a)) and the correspondence between the frequency of the post-irradiation signal comb and the frequency of the interference signal (embodiment) (FIG. 13(b)), according to a seventh variation of the embodiment of the present invention. Note here that the frequency of the post-irradiation signal comb actually has a minimum value of mfs (=nfL) (as is the case in FIG. 2), though shown as 0 in FIG. 13(b) (for illustration and explanation purposes).

Referring to FIG. 13(a), the seventh variation includes three types of predetermined frequencies S1, S2, S3 corresponding to the measuring targets. Note here that the predetermined frequencies S2 and S3 are in close proximity. Hence, referring to FIG. 13(b), any one or more (e.g. MBy) of the measurable bands include multiple predetermined frequencies (e.g. S2 and S3). That is, the measurable band MBx and the required band P1 include the predetermined frequency S1 and the measurable band MBy and the required band P2 include the predetermined frequency S2 and the predetermined frequency S3. In addition, frequency bands B1 and B2 of the interference signal corresponding to the respective multiple required bands P1 and P2 have no areas overlapping each other.

<Eighth Variation>

In an eighth variation of the embodiment of the present invention, the irradiation target is liquid or solid. For example, the presence of the measuring target is measured. For example, an FTIR is used, as an example in which the irradiation target is solid, to measure absorption (1.4 um band) by OH groups of an optical fiber. Alternatively, an FTIR is used, as an example in which the irradiation target is liquid, to determine, for example, whether water is contained based on whether or not absorption by OH groups occurs.

<Ninth Variation>

In a ninth variation of the embodiment of the present invention, the interference signal acquiring section 16 is a power beam splitter. The arrangement or absence of the multiple-band passage sections 14, 14a, 14b is the same as in the embodiment of the present invention, the first variation, the second variation, the third variation, the fourth variation, and the fifth variation.

It is noted that the outputs from the signal comb generating section 12a and the local comb generating section 12b may be caused to pass through a ½ wavelength plate and a ¼ wavelength plate. The output from the interference signal acquiring section 16 may be caused to pass through an optical attenuator and a ½ wavelength plate.

DESCRIPTION OF REFERENCE NUMERALS

1 Optical Comb Measuring Apparatus
2 DUT (Gas Cell)
12a Signal Comb Generating Section
12b Local Comb Generating Section
14, 14a, 14b Multiple-Band Passage Section
16 Interference Signal Acquiring Section
18 Frequency Spectrum Measuring Section
MB1, MB2, MB3, MB4, MBx, MBy, MBz Measurable Band
fs Repetition Frequency of Frequency of Signal Comb
fL Repetition Frequency of Frequency of Local Comb
Δf Difference in Repetition Frequency between Local Comb and Signal Comb
B1, B2, B3 Frequency Band
P1, P2, P3 Required Bands
S1, S2, S3 Predetermined Frequency

What is claimed is:

1. An optical comb measuring apparatus that measures an irradiation target having multiple types of measuring targets, comprising:
   an interference signal acquiring section arranged to acquire an interference signal between a post-irradiation signal comb obtained by irradiating the irradiation target with a pre-irradiation signal comb and a local comb set to be different from a repetition frequency of the pre-irradiation signal comb by a predetermined differential frequency; and
   a frequency spectrum measuring section arranged to measure a frequency spectrum of a result of acquisition by the interference signal acquiring section, wherein
   the pre-irradiation signal comb, the post-irradiation signal comb, and the local comb are optical combs,
   a power of light with which the irradiation target is irradiated varies at predetermined frequencies corresponding to the respective measuring targets,
   a plurality of measurable bands, each of which is a frequency range of the post-irradiation signal comb in which a single frequency of the post-irradiation signal comb corresponds to a frequency of the interference signal, each include one or more of the predetermined frequencies,
   either one or both of the post-irradiation signal comb and the local comb provided to the interference signal acquiring section have only components within a plurality of required bands including all of the predetermined frequencies, and
   frequency bands of the interference signal corresponding to the plurality of respective required bands have no areas overlapping each other.

2. The optical comb measuring apparatus according to claim 1, further comprising
   a multiple-band passage section arranged to receive either one or both of the pre-irradiation signal comb and the local comb and cause components of the plurality of required bands to pass therethrough.

3. The optical comb measuring apparatus according to claim 1, further comprising
   a multiple-band passage section arranged to receive either one or both of the post-irradiation signal comb and the local comb and cause components of the plurality of required bands to pass therethrough.

4. The optical comb measuring apparatus according to claim 1, wherein
   either one or both of the pre-irradiation signal comb and the local comb have only components within a plurality of required bands including all of the predetermined frequencies.

5. The optical comb measuring apparatus according to claim 1, wherein
   each one of the measurable bands includes each one of the predetermined frequencies.

6. The optical comb measuring apparatus according to claim 1, wherein
any one or more of the measurable bands include a plurality of the predetermined frequencies.

7. The optical comb measuring apparatus according to claim 1, wherein
the irradiation target is gas.

8. The optical comb measuring apparatus according to claim 7, wherein
the irradiation target is housed in a gas cell.

9. The optical comb measuring apparatus according to claim 7, wherein
the apparatus is arranged to measure a concentration of each measuring target.

10. The optical comb measuring apparatus according to claim 1, wherein
the irradiation target is liquid or solid.

11. The optical comb measuring apparatus according to claim 10, wherein
the apparatus is arranged to measure a presence of each measuring target.

12. The optical comb measuring apparatus according to claim 1, wherein
the post-irradiation signal comb and the local comb are provided via a polarization maintaining fiber to the interference signal acquiring section.

13. The optical comb measuring apparatus according to claim 1, wherein
the interference signal acquiring section is an optical coupler.

14. The optical comb measuring apparatus according to claim 1, wherein
the interference signal acquiring section is a power beam splitter.

* * * * *